US006006237A

United States Patent [19]
Frisbey

[11] Patent Number: 6,006,237
[45] Date of Patent: Dec. 21, 1999

[54] POSTAL AUTOMATED DELIVERY SYSTEM

[76] Inventor: Wallace N. Frisbey, P.O. Box 1, Twin Peaks, Calif. 92391-0001

[21] Appl. No.: 08/748,099

[22] Filed: Nov. 12, 1996

Related U.S. Application Data

[60] Provisional application No. 60/006,581, Nov. 13, 1995.

[51] Int. Cl.[6] .......... G06F 17/30

[52] U.S. Cl. .......... 707/104; 707/4

[58] Field of Search .......... 707/200, 4, 104; 705/27; 395/200.37, 200.58; 364/400; 379/207

[56] References Cited

U.S. PATENT DOCUMENTS

| | | | |
|---|---|---|---|
| 4,991,914 | 2/1991 | Kerstein | 312/319 |
| 5,495,581 | 2/1996 | Tsai | 395/154 |
| 5,513,126 | 4/1996 | Harkins et al. | 364/514 A |
| 5,518,122 | 5/1996 | Tilles et al. | 209/539 |
| 5,525,031 | 6/1996 | Fox | 414/789.7 |
| 5,555,496 | 9/1996 | Tackbary et al. | 364/401 R |
| 5,613,108 | 3/1997 | Morikawa | 707/200 |
| 5,787,437 | 7/1998 | Potterveld et al. | 707/103 |

*Primary Examiner*—Jack M. Choules
*Assistant Examiner*—Cheryl Lewis
*Attorney, Agent, or Firm*—Charles C.H. Wu

[57] ABSTRACT

A postal delivery system equipped with a computer database system, input peripheral devices, user input devices, a printer, and a terminal. The computer database system processes the data generated from the input peripheral device and generates sorted database output in according to the user selected sorting option. The mail or package is delivered to the appropriate designation following the sorted database output.

1 Claim, 4 Drawing Sheets

POSTAL AUTOMATED DELIVERY SYSTEM

PROVISIONAL APPLICATION

The present application claims priority from U.S. Ser. No. 60/006,581 filed on Nov. 13, 1995.

BACKGROUND OF THE INVENTION

The United States Postal Service and other non-government owned postal services provide services including, but not limited to: collection, processing, transportation, and delivering of mail or packages.

The mail room, whether it is the United States Postal Service mail room or the mail room of a corporation, currently does not have a comprehensive automated system for the efficient handling, sorting, and distribution of mail. The current system creates an inefficient work environment that fosters costly repetitive time consuming procedures.

This invention addresses the many inefficiencies and deficiencies of the processing aspects of the incoming mail.

In the United States Postal Service mail room, one of the deficiencies is the limitation of the physical area in which information can be displayed on the carriers' postal casing and routing unit. The limited space only allows for the last name of a post office box holder or street information. Typically, this information is hand written on a temporary sticky type of note pad and affixed to the casing and routing unit. Another typically used method of conveying up-to-date information to the mail room clerk is the usage of small color coded labels affixed to the casing and routing unit to reflect the current status of the mail stop. The current method of tracking the mail stop information does not adequately assist the mail room clerks and often times results in redundancy, routing errors, and late deliveries.

In addition to the above, the current system of tracking accumulated mail stop information at the United States Postal Service stations is done by the usage of index cards. Each mail stop record is kept on an index card. The index card records allow for manual processing of sorting records and record look up. Typically, the mail stop record is hand written and input manually.

Currently, all postal notices and accountable items are hand written in duplicates. Notices are pre-sorted in sequential order prior to delivery. Similarly, accountable mail is maintained with hand written reports for the purpose of tracking.

In terms of forecasting future workload and staffing requirements, the United States Postal Service currently has not implemented a consistent method of gathering relevant statistical information. The present invention also addresses this deficiency.

A great deal of machinery and automated procedures have been developed for the processing of out-going mail. These machines will print, fold, insert, seal, label, pre-sort, imprint bar code, imprint metered postage, detect thickness, weigh, and affix stamps. These machines and procedures are geared for postal savings from the consumer point of view. However, they dc not address the aforementioned inefficiencies and deficiencies in the mail room.

Searches on the commercially available solutions to the aforementioned mail room issues show that a company called M.A.I.L. Code offers a system called "In-Sort". Primarily, In-Sort is a name management database program designed for the automation of company wide personnel look-ups.

Another company called Tracer Research addresses the problem of tracking and reporting of accountable mail with a system called "Tracer." Tracer provides the ability to correctly track, route and report the multitudes of accountable mail. Typically accountable mail includes, but is not limited to, registered, certified and insured.

Another company called REI, which primarily produces furniture for mail rooms, has designed a mail casing unit equipped with plexiglass routing guide display boards. These display boards are connected to the top of the casing unit and provide routing information to the mail room clerk.

The aforementioned companies offer piece-meal solutions. They do not offer an integrated solution to the complexities typically involved in the processing department of the United States Postal Service station.

SUMMARY OF THE INVENTION

POSTAL AUTOMATED DELIVERY SYSTEM ("PADS") is a computer database system designed to manage comprehensive postal information for the purposes of processing and distributing mail efficiently.

PADS includes detailed mail stop records, current and historical data, displayed on an interactive review screen. It further includes extensive label production, change of address processing, tracking of accountable mail, and production of notices to the consumers. It also has multi-level security, daily generated tasks, a forum for inter-office communication, and system operator functions.

PADS is developed for the graphical user interface operating systems such as Microsoft Windows. The rich graphical interface provides an intuitive and consequently, a productive work environment.

In addition, bar-code data capturing and portable terminal devices can be attached to the system. The devices act as portable data entry and display machines. Rather than using a bulky full-screen terminal to enter records, the devices can quickly scan in the information that is encoded in bar-code format and update the host computer accordingly. By the same token, the devices can also display the data in the host computer's records. The bar code will act as query data input. By scanning in the bar coded query, the host computer's response can be displayed on the portable terminals.

BRIEF DESCRIPTION OF THE DRAWINGS

FIG. 3 shows the possible devices the input peripheral devices may be comprised of.

FIG. 4 shows the possible devices the user input devices may be comprised of.

DESCRIPTION OF THE PREFERRED EMBODIMENT

Figure 1:
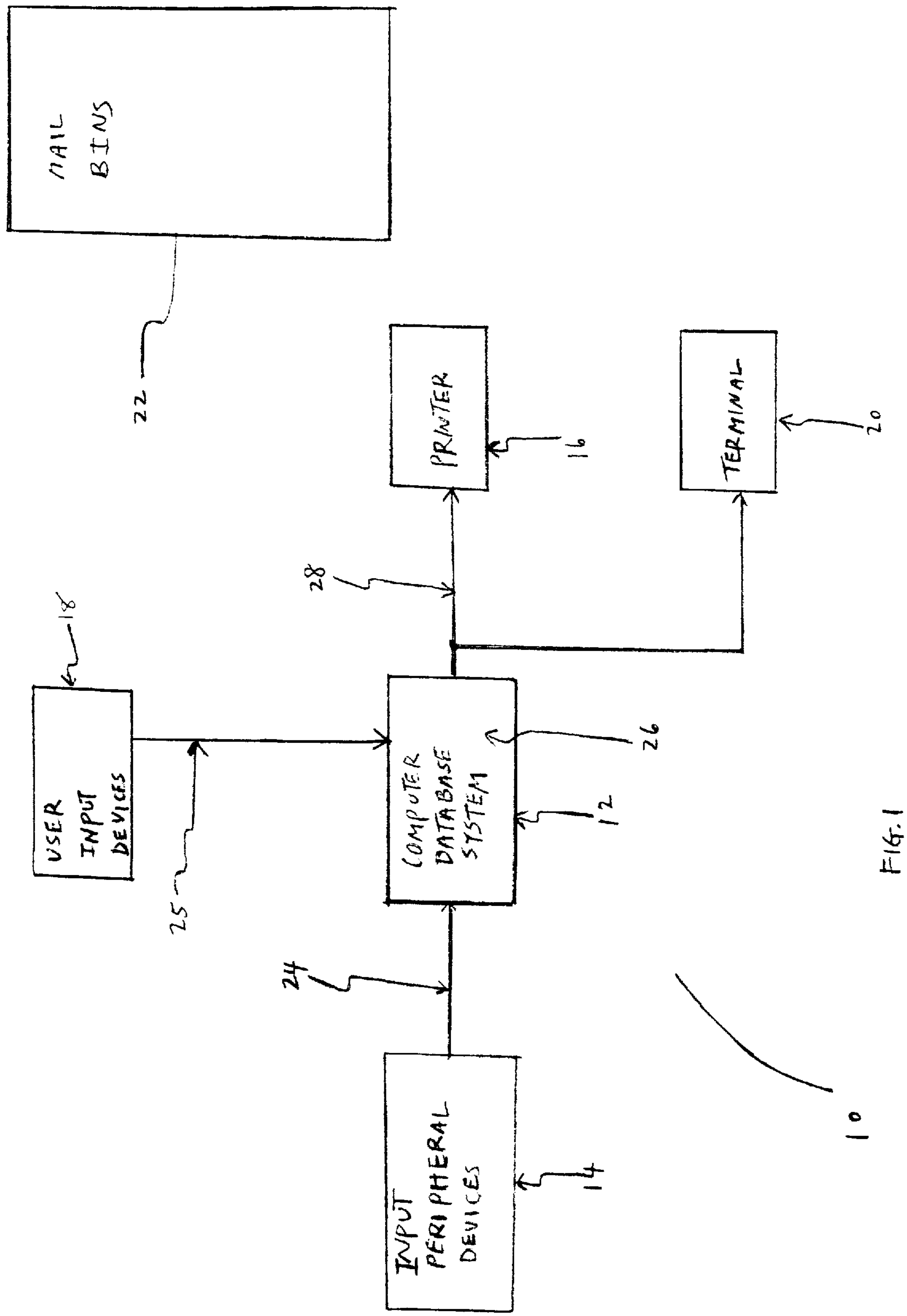
FIG. 1 shows the Postal Automated Delivery System according to the present invention.

FIG. 1 shows the Postal Automated Delivery System 10 according to the present invention. It comprises a computer database system 12, input peripheral devices 14, a printer 16, user input devices 18, a terminal 20, and mail bins 22.

The input peripheral devices 14 read in the data concerning a mail stop and generate input data 24. A user, via user input devices 18, generates control data 25 and selects an array of database sorting options 26 to instruct the computer database system 12 how to process the input data 24. The computer database system 12 generates output data 28 in accordance to the user selected database sorting option 26. The output data 28 is sent to a printer 16 or a terminal 20, or both, depending on the selected database sorting option 26. The mail or package is then routed to the appropriated mail bin 22. Alternatively, the information for a particular mail stop is updated accordingly.

Figure 2:
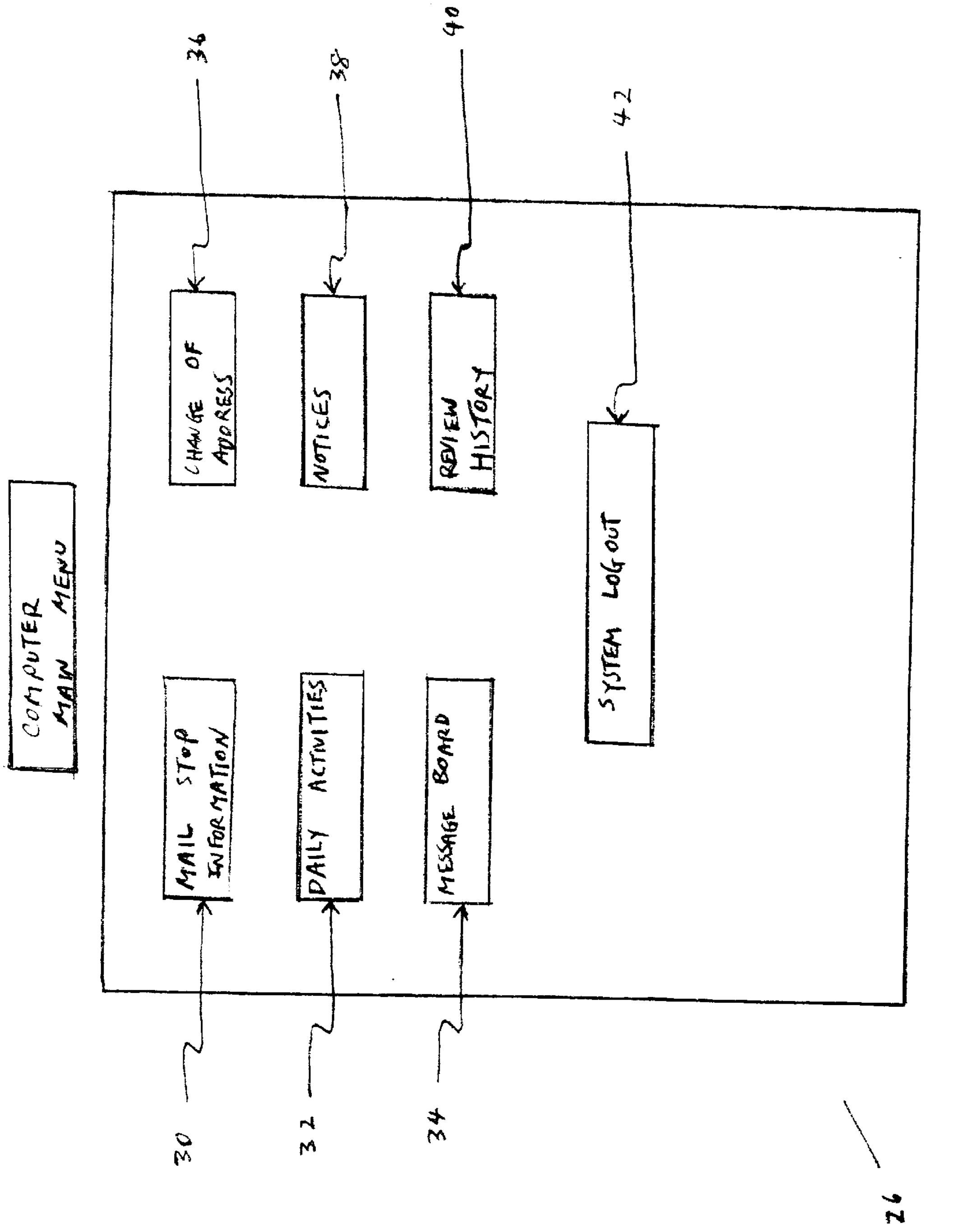
FIG. 2 shows the possible database sorting options.

FIG. 2 shows the possible database sorting options 26. Primarily, a user may retrieve mail stop information 30, daily activities 32, message board 34, change of address 36, notices 38, and review history 40. Additionally, the user may log out via system logout 42.

Figure 3:
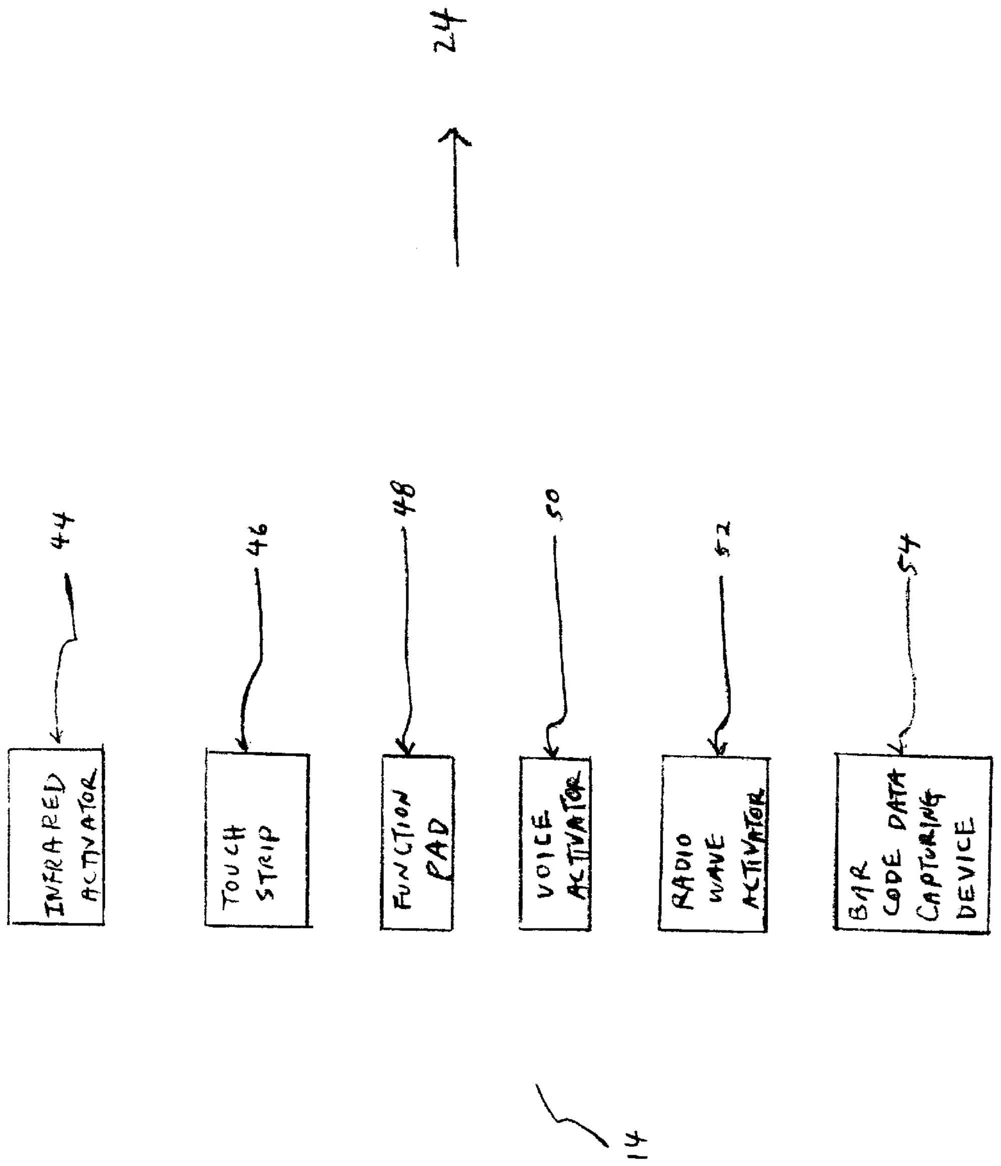

FIG. 3 shows the possible devices the input peripheral devices may be comprised of. Namely, an infrared activator 44, a touch strip 46, a function pad 48, a voice activator 50, a radio wave activator 52, or a bar code data capturing device 54. Any of the aforementioned devices may generate input 24 to the computer database system 12.

Figure 4:
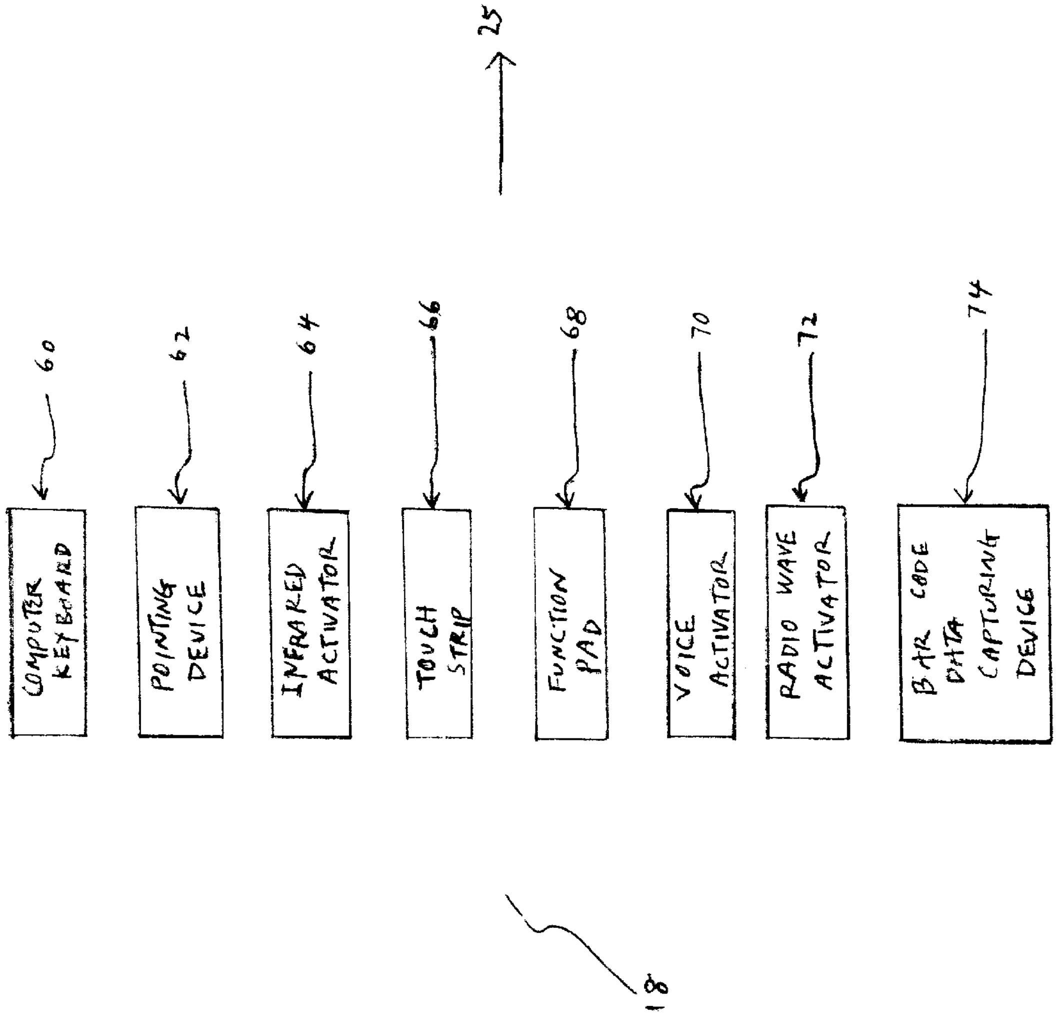

FIG. 4 shows the possible devices that the user input devices 18 may be comprised of. Namely, a computer keyboard 60, a pointing device 62 such as a mouse, an infrared activator 64, a touch strip 66, a function pad 68, a voice activator 70, a radio wave activator 72, or a bar code data capturing device 74. Any of the aforementioned devices may generate control data 25 to the computer database system 12.

In summary, the invention includes at least one computer database system 12, at least one input peripheral device 14, at least one user input device 18, and at least one terminal 20.

Although the drawings show the particulars of the database sorting options 26 and the specifics on the technologies used for the input peripheral devices 14 and user input devices 18, as technology progresses, the components of the database sorting options 26, input peripheral devices 14, and user input devices 18 may be added in accordance to the state of the art of technology.

What is claimed is:

1. A postal delivery system comprising:

a. a computer database system having means for retrieving mail stop information, means for retrieving daily activities for a mail stop, means for retrieving message left by other users concerning a mail stop, means for retrieving address change information for a mail stop, means for generating notices to the public concerning a mail stop, means for reviewing history concerning a mail stop, and means for a user to log out of the postal delivery system;

b. at least one input peripheral device attached to the computer database system generating an input data, said input peripheral device is comprised of an infrared activator, an electronic touch strip, a function pad, a voice activator, radio wave activator, or a bar code data capturing device;

c. at least one user input device attached to the computer database system generating control data, said user input device is comprised of an infrared activator, an electronic touch strip, a function pad, a voice activator, radio wave activator, or a bar code data capturing device;

d. at least one printer attached to the computer database system;

e. at least one terminal attached to the computer database system; and f. At least one mail bin for storing mail and packages, whereby the computer database system reads in the input data and control data and generates a output data to the printer and terminal.

* * * * *